(12) United States Patent
Dang

(10) Patent No.: US 6,694,410 B1
(45) Date of Patent: Feb. 17, 2004

(54) METHOD AND APPARATUS FOR LOADING/STORING MULTIPLE DATA SOURCES TO COMMON MEMORY UNIT

(75) Inventor: Keith D. Dang, Lewisville, TX (US)

(73) Assignee: LSI Logic Corporation, Milpitas, CA (US)

( * ) Notice: Subject to any disclaimer, the term of this patent is extended or adjusted under 35 U.S.C. 154(b) by 129 days.

(21) Appl. No.: 09/845,909

(22) Filed: Apr. 30, 2001

(51) Int. Cl.⁷ ............................................. G06F 12/00
(52) U.S. Cl. ...................................... 711/147; 711/154
(58) Field of Search ............................... 711/147, 150, 711/154

(56) References Cited

U.S. PATENT DOCUMENTS

| | | | |
|---|---|---|---|
| 4,682,284 A | * 7/1987 | Schrofer | 710/55 |
| 4,829,471 A | 5/1989 | Banerjee et al. | 364/900 |
| 5,155,816 A | 10/1992 | Kohn | 395/375 |
| 5,715,425 A | 2/1998 | Goldman et al. | 395/445 |
| 5,835,741 A | 11/1998 | Elkhoury et al. | |
| 5,949,799 A | 9/1999 | Grivna et al. | 371/33 |
| 6,058,461 A | 5/2000 | Lewchuk et al. | |
| 6,173,369 B1 | * 1/2001 | Nguyen et al. | 711/140 |
| 6,219,769 B1 | * 4/2001 | Strongin et al. | 711/158 |
| 6,295,586 B1 | 9/2001 | Novak et al. | |
| 6,311,257 B1 | 10/2001 | Fitzgerald et al. | |
| 6,393,531 B1 | * 5/2002 | Novak et al. | 711/154 |
| 6,393,534 B1 | * 5/2002 | Chen et al. | 711/158 |
| 6,490,661 B1 | 12/2002 | Keller et al. | |
| 6,532,505 B1 | 3/2003 | Stracovsky et al. | |
| 6,546,439 B1 | * 4/2003 | Strongin et al. | 710/52 |

OTHER PUBLICATIONS

US2002/0078163A1—Author(s)—Thomas A. Gregg.

* cited by examiner

Primary Examiner—Matthew Kim
Assistant Examiner—Woo H. Choi
(74) Attorney, Agent, or Firm—Conley Rose, P.C.

(57) ABSTRACT

A system for receiving transaction requests from a plurality of data access devices, coupling them to a shared memory having an input queue and identifying each completed transaction with the requesting device. The system includes a controller for receiving the requests and selectively coupling them to a shared memory input queue. A first-in-first-out identification memory stores a requesting device identifier which the controller uses to route transaction completion control signals and data back to the device which requested the transaction.

25 Claims, 4 Drawing Sheets

METHOD AND APPARATUS FOR LOADING/STORING MULTIPLE DATA SOURCES TO COMMON MEMORY UNIT

CROSS-REFERENCE TO RELATED APPLICATIONS

This application incorporates by reference for all purposes U.S. patent application Ser. No. 09/847,848 entitled "A Parameterizable Queued Memory Access System" by inventor Charles H. Stewart, which was filed on the same date as this application and assigned to the same assignee as the present application.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

The present invention relates to shared memory units and more particularly to a system for managing access to a shared memory by a plurality of independent data access devices.

As their name implies, application specific integrated circuits, or ASICs, are essentially integrated circuits implemented on a chip designed for a specific use or application. ASICs are used for numerous applications. For instance, ASICs are used for machine-to-machine communications for the space shuttle, for DVD processing, for advanced digital signal processing, for trans-oceanic cables, etc. Such special purpose processors can be embedded in essentially any equipment to enhance and control its functions.

Typically an ASIC includes one or more core processors, including digital signal processors (DSPs), memory and other functional devices on a single semiconductor chip. Having the devices on the same chip allows data to be easily and quickly transferred between the various devices on the chip. The memory used in ASICs may be shared memory, which allows the various core processors and other devices to work with the same sets of data or transfer data by writing and reading from the same memory addresses.

While the use of shared memory has a number of advantages, it may also slow down the overall system operation. Standard memory and bus protocols require that each device reading from or writing to a memory, i.e. masters, must request a transaction and then wait until the memory, i.e. the slave, has completed the transaction before requesting another transaction. In shared memory, this can cause delays because the memory can process only one request at a time and other devices may have priority. For example, if a digital signal processor (DSP) is one of the devices using the shared memory, it may be given the highest priority for access to the memory. For a single master accessing shared memory through a dedicated port, the memory may be provided with a request queue which allows the master to proceed with other operations while its memory transaction requests are pending in the queue.

Since there are a limited number of access ports for a shared memory unit, multiple cores, DSPs, and other independent access devices may need to share a single memory port. In this case, use of a queue causes a problem, because transaction requests from more than one master will be placed in the queue in the order in which received. However, when each transaction is completed there is no way for the multiple masters to know which one requested the transaction and should, for example, read the data being provided by the memory. If a queue is not used, then not only must the requesting master wait for completion of its request, but other master requests cannot be made until the pending transaction is completed.

It would be desirable to be able to use an input queue in a shared memory port and also allow multiple devices to share the same input port.

BRIEF SUMMARY OF THE INVENTION

In accordance with the present invention, a system is provided for receiving memory transaction requests from a plurality of masters, coupling the requests to a port of a shared memory having an input queue, identifying each request with the requesting device and identifying each memory response with the proper requesting device. The system includes a request controller for receiving requests from the plurality of masters and selectively forwarding the requests to the shared memory. It also includes a first-in-first-out memory for storing an identifier of the source of each request coupled to the shared memory and for providing source identifier information to route each memory response to the master which made the request corresponding to the response.

DETAILED DESCRIPTION OF THE INVENTION

Figure 1:
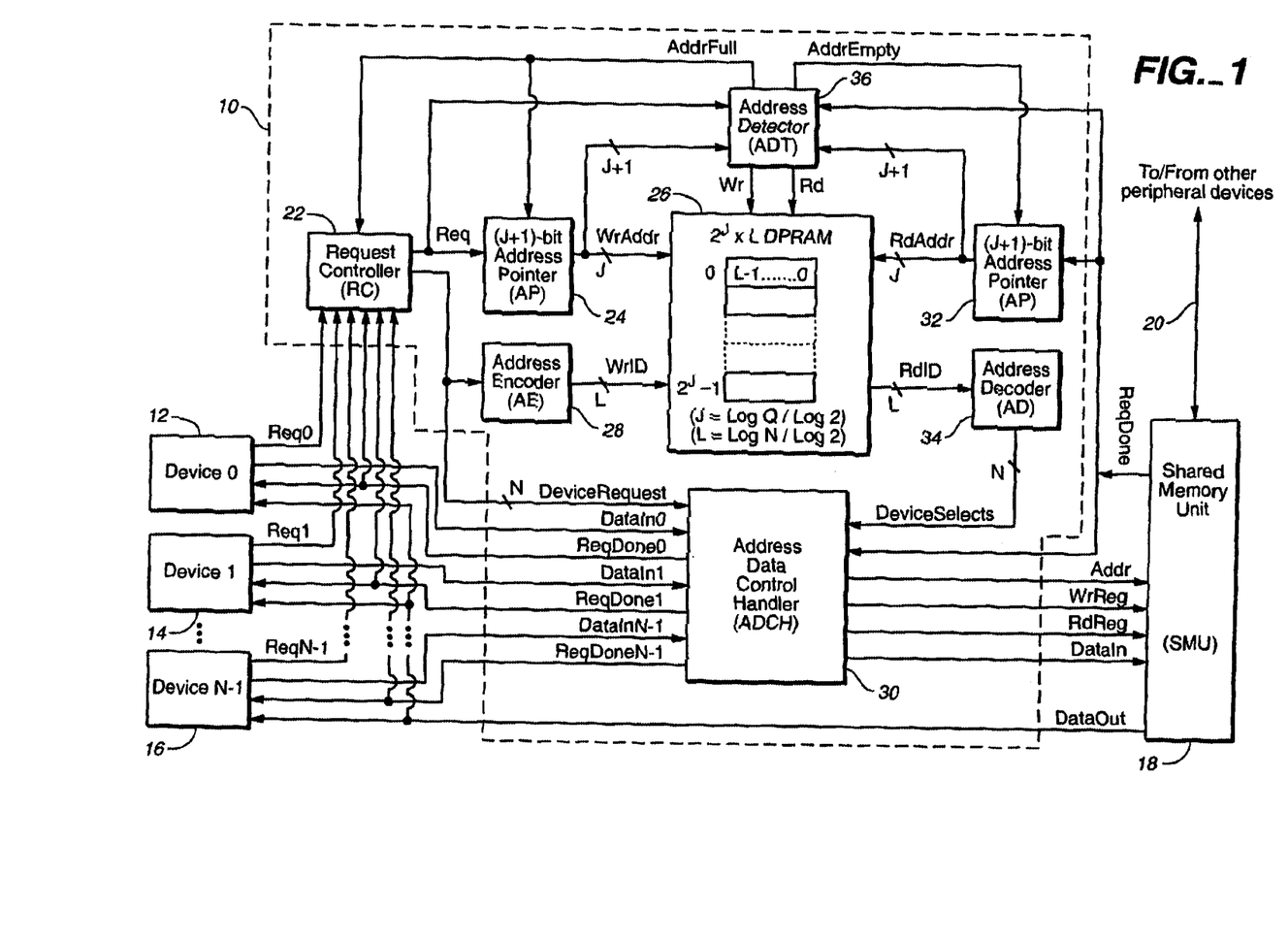
FIG. 1 is a block diagram of an embodiment of apparatus for managing memory transaction requests from multiple devices to a shared memory; and, FIGS. 2a, 2b and 2c together provide a timing diagram illustrating the function of the apparatus of FIG. 1 and the method of operation of the present invention.

With reference to FIG. 1, the structure of an embodiment of the present invention will be described. A memory manager according to the present invention includes the components shown within the dotted line 10. The manager 10 is connected between a plurality of independent data access devices 12, 14, and 16 and a shared memory unit 18. The devices 12, 14, and 16 may be any device which is capable of reading data from and/or writing data to memory. Such devices include RISC processors, digital signal processors and other cores which may be found in application specific integrated circuits. The devices 12, 14, and 16 may also be any device which acts as a master on a bus used to couple signals between master and slave devices. While devices 12, 14, and 16 and memory 18 may be implemented on a single chip, the present invention is equally useful if each of devices 12, 14, and 16, the memory 18 and the components of manager 10 are separately mounted on a printed circuit board or on separate boards coupled together over a backplane or other bus arrangement.

In this embodiment, the shared memory 18 may be any conventional random access memory (RAM) having multiple ports and adapted for being shared by multiple masters or other independent data access devices. In addition to its connections to manager 10, the memory 18 has other ports, such as port 20, which allow other peripheral devices to share the memory 18. The memory 18 includes an input queue which allows it to accept and temporarily store a number of transaction requests. The above referenced patent application entitled "A Parameterizable Queued Memory Access System" by inventor Charles H. Stewart discloses a suitable queue. For purposes of explaining the invention, the queue in memory 18 is selected to have a depth of four, i.e. it can store up to four pending transaction requests. The present invention is also useful with a memory having a single input port with an input queue, and can be used to make such a memory operate as a shared memory. For the purposes of this invention, such a single port computer memory is considered a shared memory since the present invention allows it to be shared by multiple access devices.

The manager 10 of the present invention includes a request controller 22, also designated RC, for receiving memory transaction requests from devices 12, 14, and 16 and selecting the next one to be coupled to shared memory 18. Manager 10 operates like an arbiter in an ASIC bus system. An address pointer 24 is one of the devices which receives a request selected indication from RC 22, and provides an address location to an ID memory 26. An address encoder 28 also receives the memory transaction requests from RC 22 and produces an address or identification number, ID, for writing into the memory 26 at the address location provided by address pointer 24.

The ID memory 26 is a dual port random access memory. It has one set of ports for writing data, in this case IDs, into the memory and a second set of ports for reading data, the IDs, from the memory. The depth of the memory, i.e. the number of memory locations, corresponds to the depth of the queue in shared memory 18, which in this embodiment is four. The width of each memory location corresponds to the number of bits needed to identify all of the devices 12, 14 and 16. In the preferred embodiment, there are eight devices 12, 14 and 16 so that the width of ID memory 26 locations is three bits.

An address and data control handler 30, also designated ADCH, receives data from devices 12, 14, and 16 and device request signals from RC 22 for coupling to memory 18. The data from devices 12, 14, and 16 also includes control information including the address of memory 18 to which data is to be written, or from which it is to be read, and the read or write control signal. The ADCH 30 is also connected to the shared memory 18 to provide data to be written into memory 18 as well as the address and read and write control signals. The ADCH 30 also selectively couples a request done signal from memory 18 to the appropriate device 12, 14, and 16.

A second address pointer 32 receives request done signals from memory 18 and provides read addresses to the ID memory 26. An address decoder 34 receives the ID stored in ID memory 26 at the location provided by pointer 32 and decodes this into device select signals which are coupled to ADCH 30 for its use in selecting to which device 12, 14, and 16 should receive a request done signal.

An address detector 36, also designated ADT, receives and compares ID memory addresses provided by address pointers 24 and 32. It also receives request signals issued by request controller 22 and request done signals from shared memory 18. The ADT 36 issues read and write control signals to ID memory 26 and an address full signal to request controller 22 and address pointer 24 and an address empty signal to address pointer 32.

Each of the signal lines in FIG. 1 is identified by a signal name. The function of manager 10 and each of its components can be better understood by understanding the functions of each of the signals. Each signal is explained below.

A memory transaction request signal, ReqX, is provided by each of the devices 12, 14, and 16 to indicate that the device wishes to perform a read or write transaction with the shared memory 18. As shown in FIG. 1, device 12 is also designated Device 0, and its memory transaction request signal is designated as Req0. Likewise device 14 is also designated Device 1 and issues a Req1 signal. There may be an arbitrary number N of devices 12, 14, and 16. For purposes of explaining the invention, the number N was selected to be eight in this embodiment. Each device 12, 14, and 16 has a separate signal line connecting its ReqX signal to the request controller 22.

A device request signal, DeviceRequest, is produced by request controller 22 in response to the receipt of ReqX signals. As indicated in FIG. 1, the DeviceRequest line comprises N, in this case eight, separate lines. Each of these lines represents one of the devices 12, 14, and 16 and only one line can be asserted at a time. The request controller 22 acts as an arbiter and asserts the DeviceRequest signal corresponding to the ReqX signal which it has selected for coupling to the shared memory 18. Various algorithms can be used for selecting which ReqX will be selected, for example daisy-chain, priority level, etc. In the present embodiment, priority is based on the lowest device number, that is Device 0 has priority over Device 1 which has priority over Device 2 and so on. So if Req3 and Req7 are asserted at the same time, Req3 will be selected and the fourth DeviceRequest signal line will be asserted. If no other ReqX signals are asserted, the eighth DeviceRequest signal line will be asserted on the next clock cycle. The DeviceRequest signals are coupled to the address and data control handler 30 and to the address encoder 28. Upon receipt of the DeviceRequest signal, the ADCH 30 accepts the DataIn signal from the selected device 12, 14, and 16 and provides the appropriate address, read or write, and data signals to the memory 18.

Each of the devices 12, 14, and 16 has an output labeled DataInX. The "X" corresponds to the device identifying numbers as with the ReqX signal. This DataX signal includes an address of a location in shared memory 18, a read or write control signal, and, for a write request, data to be written into the selected memory 18 address location. This signal is provided by a device 12, 14, and 16 in conjunction with issuance of a ReqX signal by the respective device 12, 14, and 16. As indicated in the preceding paragraph, this DataInX signal is the source of information which the ADCH 30 provides to shared memory 18.

The address and data control handler 30 provides four signals to the shared memory 18. An address signal, Addr, is the address of a location in memory 18 to which data is to be written or from which data is to be read. A write request signal, WrReq, indicates that the current request is for a write transaction, i.e. to write data into the address location indicated by Addr. A read request signal, RdReq, indicates that the current request is for a read transaction, i.e. to read data from the address location indicated by Addr. The DataIn signal is data to be written into memory 18 at the address location indicated by Addr. Upon receipt of a DeviceRequest signal, ADCH 30 derives these signals from the DataInX signal identified by the DeviceRequest signal and provides the appropriate Addr, WrReq or RdReq and, for a write transaction, DataIn.

An identification word, WrID, is generated by address encoder 28 in response to the DeviceRequest signals. The WrID signal has a width corresponding to the width of memory locations in ID memory 26, in this embodiment three, since there are eight devices 12, 14, and 16 to be identified. For each request, DeviceRequest, issued to ADCH 30, the address encoder 28 provides the identification word to ID memory 26 to keep track of which device 12, 14, and 16 issued the request.

A request signal, Req, is asserted by request controller 22 during each clock cycle during which it has received a new ReqX signal which it can accept. The Req signal is coupled to the address pointer 24 which is a counter which increments by one for each clock cycle in which the Req signal is asserted and ID memory 26 is not full. The Req signal is also coupled to the address detector 36.

A write address signal, WrAddr, is produced by address counter 24. The WrAddr signal is coupled to the write address input of ID memory 26 to select a memory location into which the WrID is to be stored. In the example described herein, there are four memory locations in ID memory 26. Only two bits is required to select these four locations. Address pointer 24 has one more bit, i.e. in this example it has three bits. Only the two least significant bits are coupled to the address input of ID memory 26. All three bits are coupled to address detector 36.

A request done signal, ReqDone, is produced by shared memory 18 each time it completes a read or write transaction from the internal queue. This ReqDone signal is coupled to the ADCH 30, which then issues a request done signal to the appropriate device 12, 14, and 16 as explained in more detail below. The ReqDone signal is also coupled to the address pointer 32, which is a counter essentially identical to address pointer 24. During each clock period in which address pointer 32 receives the ReqDone signal, it increments its value by one. In the present example, the pointer 32 is a three-bit counter. The ReqDone signal is also coupled to the address detector 36.

The address pointer 32 produces a read address signal, RdAddr, which is coupled to the read address input of ID memory 26. The RdAddr signal is the three-bit value of the address pointer 32. Only the two least significant bits of the counter value are coupled to the read address input of ID memory 26. All three bits are coupled to the address detector 36.

A read identification signal, RdID, is produced by ID memory 26 when it is given a read command. This RdID signal is the three bit data word stored in the location selected by the RdAddr signal, and identifies the appropriate device 12, 14, and 16 which should be receiving the most recently issued ReqDone signal from shared memory 18.

A set of device select signals, DeviceSelects, are generated by address decoder 34 in response to the RdID signal. In this embodiment, there are eight device select lines, one corresponding to each of the devices 12, 14, and 16. The decoder 34 converts the three-bit identification word, RdID, into one asserted line on the DeviceSelects bus. Only one of these lines can be asserted at a time.

The DeviceSelects signals are coupled to the address and data control handler 30. In response, the ADCH 30 knows which device 12, 14, and 16 is the intended recipient of the latest ReqDone signal, and issues the appropriate ReqDoneX signal. The "X" in each ReqDoneX signal indicates which of the devices 12, 14, and 16 receives the ReqDoneX signal. That is, ReqDone0 goes to Device 0 (device 12), ReqDone1 goes to Device 1 (device 14) and so on.

On read transactions, the shared memory 18 provides data on the DataOut signal lines. The DataOut signal is coupled to data inputs of each of the devices 12, 14, and 16. Only the device 12, 14, and 16 which has its ReqDoneX signal asserted reads the data.

The address detector provides an address full signal, AddrFull, and an address empty signal, AddrEmpty, in response to the Req, WrAddr, RdAddr, and ReqDone signals. By comparing the WrAddr and RdAddr signals, the address detector 36 can determine if the ID memory 26 is full or empty. The full condition means that new addresses have been written into every memory location in ID memory 26. A new address is an address which has not yet been read from the ID memory 26. In the present example of a depth of four in ID memory 26, this means that four addresses have been stored in the ID memory and none of the four has yet been read out. When this address full condition occurs, the AddrFull signal is asserted and prevents the request controller 22 from accepting any more requests ReqX and prevents address pointer 24 from incrementing.

The ID memory 26 is in the address empty condition if there are no new addresses stored in the ID memory 26. This occurs whenever the number of device identifications read from ID memory 26 equals the number of device identifications previously written into ID memory 26. When the empty condition occurs, the signal AddrEmpty is asserted and this prevents the address pointer 32 from incrementing if it should receive a spurious ReqDone signal.

As noted above, the address pointers 24 and 32 are counters having a length one bit longer than needed to address all memory locations in ID memory 26. This makes them double range counters. All of the bits are coupled to the address detector 36 and the extra bit allows it to make the full and empty condition comparisons. The AddrFull signal is generated when the Req is asserted and WrAddr minus the RdAddr equals the number of storage locations in ID memory 26, which in this embodiment is four. The AddrEmpty signal is generated when ReqDone is asserted and the WrAddr equals the RdAddr.

The address detector 36 also provides write and read control signals, Wr and Rd, which are coupled to the ID memory 26. When the address detector 36 receives the Req signal from request controller 22, it asserts the Wr signal which causes ID memory to write the WrID word into the address location indicated by the WrAddr signal, unless the full condition has been detected. When the address detector 36 receives the ReqDone signal, it asserts the Rd signal which causes the ID memory to read from the address indicated by the RdAddr signal, unless the empty condition has been detected.

Having described the system signals and their functions, an overall description of system function will now be provided. When one of the devices 12, 14, and 16 needs to perform a read or write transaction with shared memory 18, it asserts its ReqX signal. If AddrFull is not asserted, the request controller 22 asserts Req and asserts the DeviceRequest line corresponding to the device 12, 14, and 16 which issued the ReqX signal. The address pointer 24 receives the Req signal and increments by one. The address encoder 28 receives the DeviceRequest signal and provides a WrID signal identifying the device 12, 14, and 16 which issued the ReqX. The address detector 36 responds to the Req signal by asserting the Wr signal, causing the ID memory to store the WrID at the location indicated by WrAddr. The ADCH 30 receives the DeviceRequest and couples the DataInX information from the requesting device 12, 14, and 16 to the appropriate Addr, WrReq, RdReq and Datain inputs of the shared memory 18. The inputs to shared memory 18 are loaded into the internal queue until the shared memory 18 can complete the requested transaction. This process can be continued for up to three more ReqX signals from other devices 12, 14, and 16. When four requests have been loaded into the queue and none have been completed, the ID memory 26 will be full and the AddrFull signal will be asserted preventing the acceptance of any more ReqX signals. No more ReqX requests can be accepted and loaded into the queue until the shared memory 18 completes transactions in the queue.

When the memory 18 completes the first transaction in the queue, it asserts the ReqDone signal, and if the request was a read request, it also places a word of data on the DataOut lines. In response to the ReqDone signal, the address pointer 32 increments by one and the address detector 36 issues a Rd command, assuming that the empty condition has not been detected. The Rd command causes the ID memory 26 to provide the contents of the memory location identified by RdAddr on the RdID signal line to the address decoder 34. In this example, this first ReqDone would correspond to the first request stored in the queue. The address decoder 34 asserts the DeviceSelects signal line corresponding to the device 12, 14, and 16 which issued the first address, because its address was written in the first unread location in ID memory 26. In response to the ReqDone and DeviceSelects signals, the ADCH 30 asserts the ReqDoneX signal to the appropriate device 12, 14, and 16. When the device 12, 14, and 16 receives the ReqDoneX signal it knows that its requested transaction has been completed, and if it was a read transaction, it accepts the data on the DataOut lines. Having read the first address from the ID memory 26, it is no longer full and the AddrFull signal is deasserted so that another ReqX signal could be accepted. The shared memory 18 may continue completing requests in its queue and issuing the ReqDone signals which will cause successive addresses in ID memory to be read out in the order in which they were stored. In this way the devices 12, 14, and 16 always receive the request done signals corresponding to the requests which they issued. This process can continue until the queue is empty. If the shared memory 18 completes all of the pending requests in its queue before any new requests are placed into the shared memory 18 queue, the address detector 36 will assert AddrEmpty to prevent any further incrementing of address pointer 32.

In the preceding description of the preferred embodiment, the length of shared memory 18 queue is four and the length of the ID memory 26 is also four. This embodiment includes eight devices 12, 14 and 16 and the ID memory has storage locations which are three bits long to allow identification of all eight of the devices 12, 14 and 16. Other sizes of queue and other numbers of devices 12, 14 and 16 can be allowed to share the access port to shared memory 18. It is preferred that the numbers of parts be related as follows and as indicated in FIG. 1. The length of the queue in shared memory 18 is represented by "Q". The number of address locations in ID memory 26 is $2^J$ where J=Log Q/Log 2. The number of devices 12, 14 and 16 is represented by "N". The length of each address location in ID memory 26 is "L" where L=Log N/Log 2. The address pointers 24 and 26 are counters having a length of J+1 bits, with the least significant J bits being used to address ID memory 26 and all J+1 bits being coupled to address detector 36. The number of actual lines in the 5 DeviceRequest bus and the DeviceSelects bus is N.

Figure 2A:
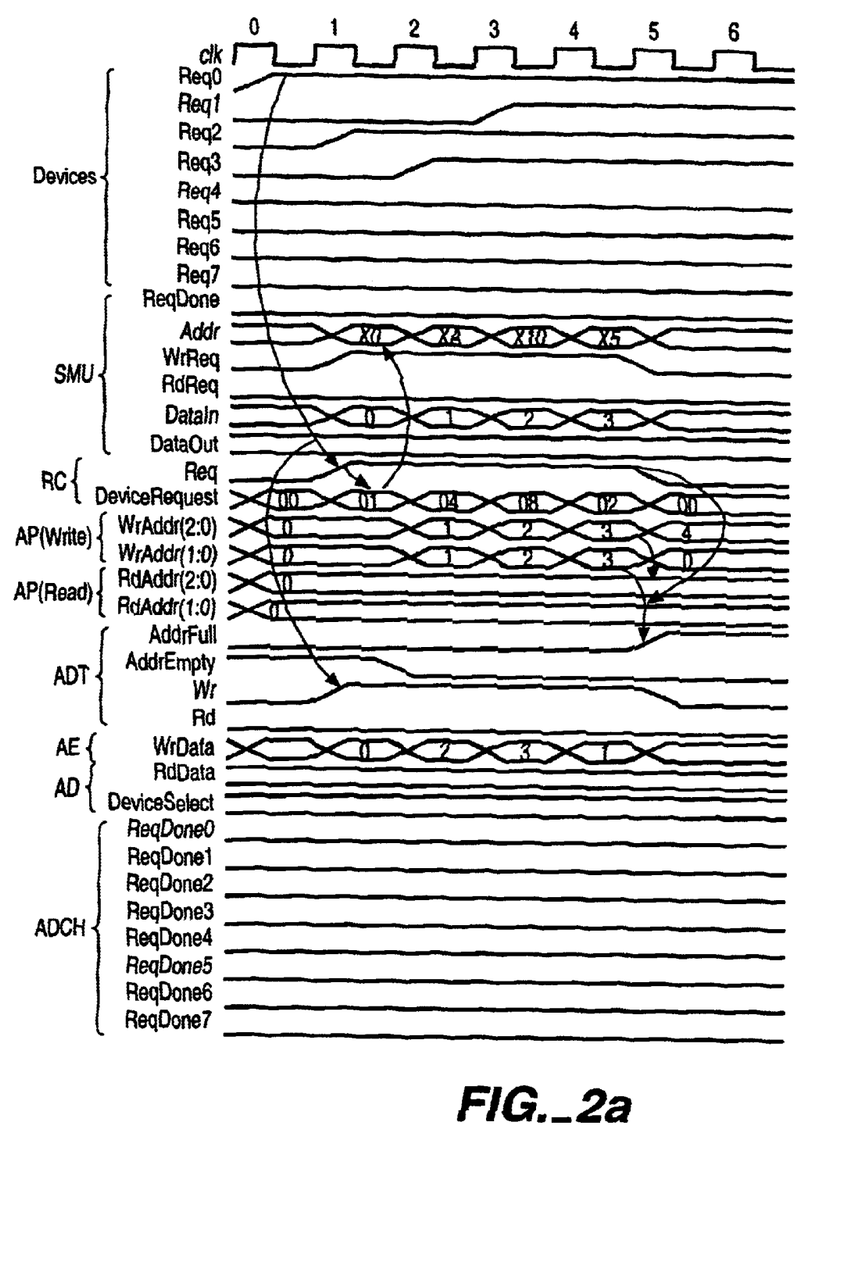
Figure 2B:
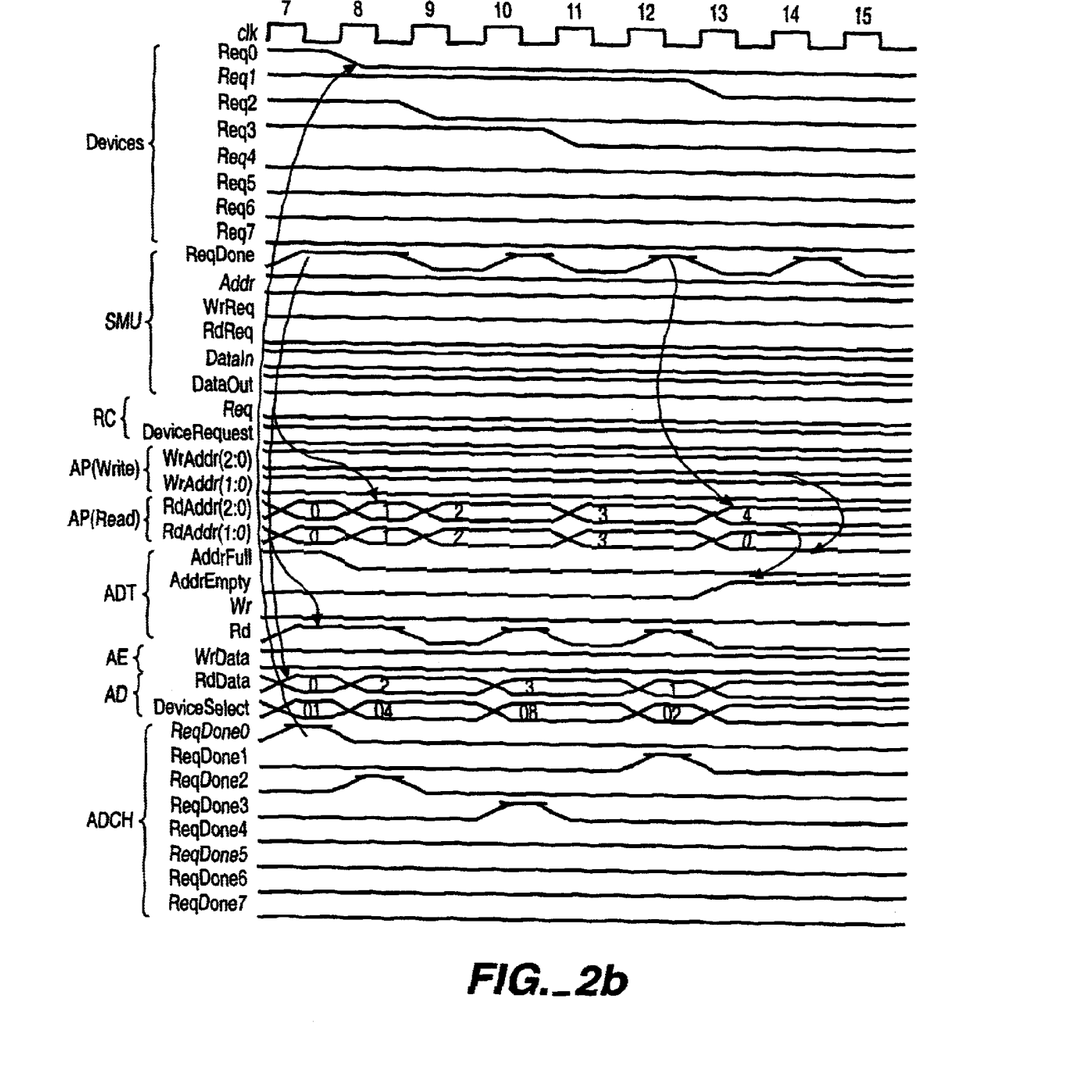
Figure 2C:
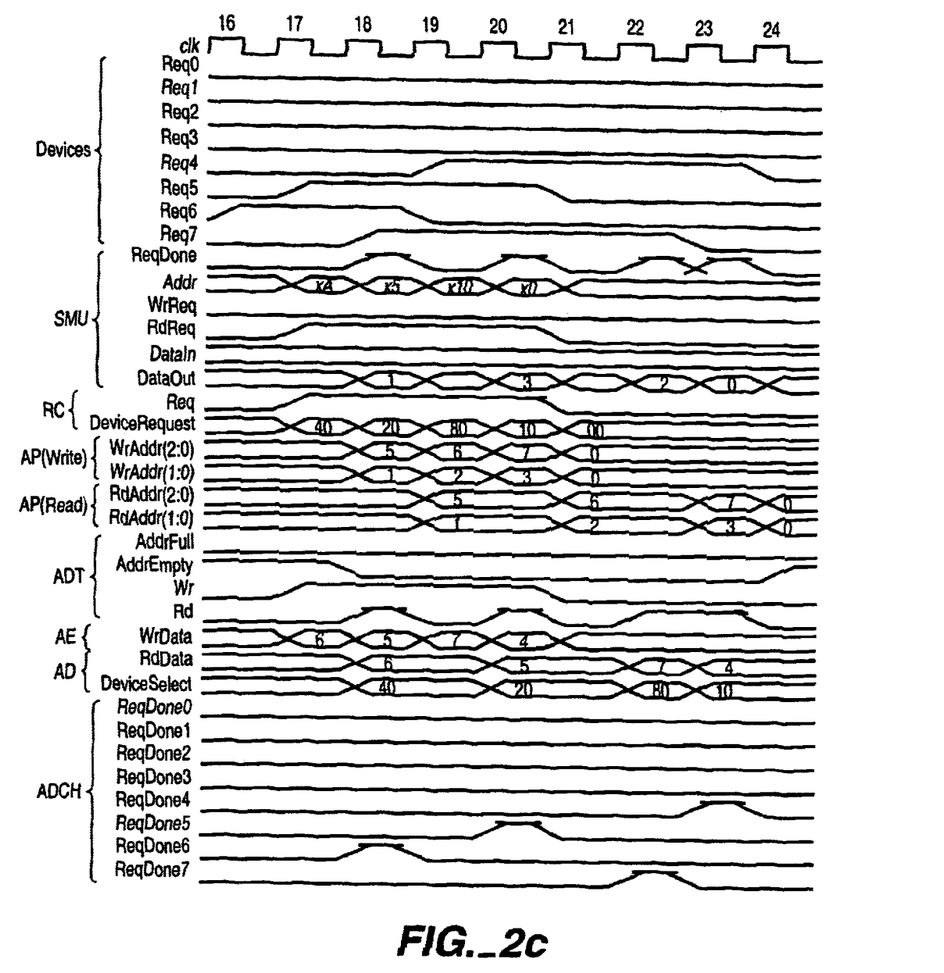

FIG. 2, comprising FIGS. 2a, 2b and 2c, is a timing diagram providing an example of operation of the present invention. In this example the specific component sizes discussed above are used. The input queue of shared memory 18 has a depth of four and ID memory 26 has a depth of four. A total of eight data access devices 12, 14 and 16 are used and the width of memory locations in ID memory 26 is three bits.

For this example, in FIG. 2a the first four of devices 12, 14 and 16, designated Device 0, Device 1, Device 2 and Device 3, are writing data to the shared memory 18 at locations starting with hexadecimal addresses X0, X5, XA, and X10 respectively. After the four write transactions, in FIG. 2c Device 4, Device 5, Device 6 and Device 7 are reading the data from the shared memory 18 at locations starting with hexadecimal addresses X0, X5, XA, and X10 respectively so that they will be reading the data just written.

Coming out of reset, the circuit remains in idle state and all internal signals are set to the inactive state. On clock cycle 0, clk 0, Device 0 requests a transaction with shared memory 18 by asserting Req0. The request controller 22 detects the Req0 signal and asserts the Req and the appropriate DeviceRequest signals on the next clock cycle, clk 1. The indicated DeviceRequest values are the hexadecimal representation of which one of the eight lines is asserted. This causes address encoder 28 to provide a WrID identifying Device 0, address detector 36 to assert Wr, and ID memory 26 to store the WrID on clk 1 and causes address pointer 24 to be incremented by one on clk 2. The DeviceRequest signal also causes address and data control handler 30 to read DataIn0 and set the Addr to X0, assert WrReq and provide DataIn of "0" to shared memory 18. During clk 1, Device 2 asserts Req2 and this is detected by request controller 22 which repeats the process described for the request from Device 0. The process is repeated for Req3 and Req1 at which point the queue is full because the ReqDone signal has not been asserted by shared memory 18. The AddrFull signal is therefore asserted by address detector 36 on clk 5. At this point the shared memory 18 has its queue full of requests to write data of "0", "1", "2" and "3" at addresses X0, XA, X10, and X5 respectively and the ID memory has stored the identifications of Device 0, Device 2, Device 3 and Device 1 in order which identifies the sources of the four requests in the queue.

In FIG. 2b, the shared memory 18 is shown completing the requested transactions during clock cycles 7 through 15, i.e. clk 7 through clk 15. The transactions are completed in the order in which they were placed in the queue and therefore in the order of device identifications stored in ID memory 26. In this example the transactions are completed and a corresponding ReqDone signal is asserted in each of clock cycles 7, 8, 10 and 12. The first transaction is the request from Device 0 to write the data "0" into address location X0. The assertion of ReqDone in clk 7 causes several things to happen. It causes address detector 36 to assert the Rd signal and causes address pointer 32 to increment by one on clk 2. The ID memory 26 provides RdID which identifies Device 0 and the address decoder 34 provides the DeviceSelects signal which identifies Device 0. The ADCH 30 asserts ReqDone0 which causes Device 0 to deassert its Req0 signal. The AddrFull signal is deasserted. This process is repeated for Device 2, Device 3 and Device 1 in order during clock cycles 8, 10 and 12. When the last request in the queue has been served, the AddrEmpty signal is asserted indicating that there are no more pending requests. Any further ReqDone assertion would be spurious and would be ignored. Such an assertion is illustrated at clk 14 and has no meaning after AddrEmpty is asserted.

In FIG. 2c, during clock cycles 16, 17, 18 and 19, the Req6, Req5, Req7 and Req4 signals are asserted by Device 6, Device 5, Device 7 and Device 4 respectively to read the data stored in shared memory 18 locations XA, X5, X10 and X0 respectively during the preceding clock cycles. The method of operation is essentially the same as described for the write cycles except that data is read from shared memory 18 by each of the requesting devices and the requests are completed quickly enough to avoid assertion of the AddrFull signal. At clk 16, Device 6 asserts Req 6. At clk 17 the request controller 22 asserts the Req and appropriate DeviceRequest signals to cause the read request to be placed in the queue of shared memory 18 and the WrID of Device 6 to be written into ID memory 26. The shared memory 18 completes this first read request during clk 18 and asserts ReqDone which causes the RdID of Device 6 to be read out of ID memory 26, the appropriate DeviceSelects signal to be asserted, the ReqDone6 signal to be asserted, Device 6 to read the DataOut, and the Req6 signal to be deasserted at clk 19. Since this all occurs before Req4 was accepted, AddrFull is not asserted. The process is repeated for Req5, Req7 and Req4. Upon completion of the four read transactions, Device 6, Device 5, Device 7 and Device 4 have read out the data values "1", "3", "2" and "0" from memory locations XA, X5, X10 and X0 respectively.

While the present invention has been illustrated and described in terms of particular apparatus and methods of use, it is apparent that equivalent parts may be substituted of those shown and other changes can be made within the scope of the present invention as defined by the appended claims.

What I claim as my invention is:

1. Apparatus for managing transactions between a plurality of memory access devices and a shared memory having an input queue, comprising:

an address and data controller coupled to the memory access devices and the shared memory, the address and data controller coupling transaction request control signals and data from the memory access devices to the shared memory; and an identification memory coupled to the memory access devices, the shared memory and the address and data controller, the identification memory storing an identifier for each memory access device in the order in which transaction requests from the memory access devices are transmitted to the shared memory;

upon completion of a transaction request, the shared memory providing transaction completion information to the address and data controller and the identification memory;

the identification memory providing, in the order in which they were stored, one of the stored identifiers to the address and data controller each time that the identification memory receives transaction completion information from the shared memory; and the address and data controller providing the transaction completion information received from the shared memory to the memory device associated with the identifier provided by the identification memory.

2. The apparatus of claim 1 wherein the identification memory is a first-in-first-out memory which reads out the stored identifiers in the order in which they were stored.

3. The apparatus of claim 1 further comprising a request controller coupled to the plurality of memory access devices and the address and data controller, the request controller receiving transaction requests from the plurality of memory access devices and selectively issuing transaction requests to the shared memory via the address and data controller.

4. The apparatus of claim 3 wherein the address and data controller couples transaction request control signals and data from the memory access devices to the shared memory in response to transaction requests issued by the request controller.

5. The apparatus of claim 1 further comprising an address encoder coupled to the memory access devices and the identification memory, the address encoder producing a unique identifier for each memory access device for storage in the identification memory when its transaction request is coupled to the shared memory.

6. The apparatus of claim 5 further comprising a write address pointer coupled to said memory access devices and producing write addresses for storing said unique identifiers in said identification memory.

7. The apparatus of claim 6 further comprising a read address pointer coupled to said shared memory and producing read addresses for reading said unique identifiers from said identification memory each time the shared memory completes a requested transaction.

8. The apparatus of claim 7 further comprising an address decoder coupled to said identification memory and the address and data controller, the address decoder converting said unique identifiers into signals indicating, to the address and data controller, which memory access device issued the request which was last completed.

9. The apparatus of claim 8 further comprising an address detector coupled to said write address pointer and said read address pointer and detecting when every identification memory storage location has been filled with unique identifiers which have not yet been read from the identification memory.

10. The apparatus of claim 8 further comprising an address detector coupled to said write address pointer and said read address pointer and detecting when every unique identifier previously stored in said identification memory has been read from the identification memory.

11. The apparatus of claim 7 wherein said write address pointer and said read address pointer each comprise a counter having a length one bit longer than needed to address all storage locations in the identification memory.

12. A method for executing memory transactions requested by a plurality of memory access devices in a shared memory having an input queue comprising:

storing, in a device identification queue, a device identifier for each memory access device requesting a transaction with the shared memory, the device identifiers stored, in the device identification queue, in the same order that the memory access devices requested transactions, upon receipt of transaction completion information from the shared memory, removing one of the device identifiers from the device identification queue, the device identifiers removed from the device identification queue in the same order in which they were stored in the device identification queue, and using the removed device identifier to route the transaction completion information to the memory access device which made the corresponding transaction request.

13. The method of claim 12 further comprising:

storing said device identifiers in a first-in-first-out memory in the order in which transactions with the shared memory are requested, and reading one of said device identifiers from said first-in-first-out memory each time that the shared memory completes a transaction.

14. The method of claim 13 further comprising accepting transaction requests and coupling such requests to the shared memory unless every storage location in said first-in-first-out memory has been filled with a unique identifier which has not been read from the first-in-first-out memory.

15. The method of claim 13 further comprising reading said device identifiers from said first-in-first-out memory each time that the memory completes a transaction only if the number of unique identifiers which have previously written into said identification memory exceeds the number which have been read from said identification memory.

16. The method of claim 13 further comprising using a write counter having a length one bit longer than needed to address every storage location in said first-in-first-out memory to provide write addresses to said first-in-first-out memory for storing said unique identifiers.

17. The method of claim 16 further comprising using a read counter having a length one bit longer than needed to address every storage location in said first-in-first-out memory to provide read addresses to said first-in-first-out memory for reading said unique identifiers.

18. The method of claim 17 further comprising using the counts in said read counter and said write counter to determine when the first-in-first-out memory is full of identifiers which have not been read from the first-in-first-out memory.

19. The method of claim 17 further comprising using the counts in said read counter and said write counter to determine when the first-in-first-out memory has no stored identifiers which have not been read from the first-in-first-out memory.

20. Apparatus for managing memory transactions between a plurality of memory access devices and a memory having an input queue comprising:

controller means for controlling the transfer of requests for memory transactions and data from the memory access devices to the memory;

identification memory means for storing, in the order in which they are received, a device identifier for each memory access device upon receipt of each request for a memory transaction;

means for providing transaction request completion information to the identification memory means and the controller means, said identification memory means providing, in the order in which they were stored, one of the stored device identifiers each time that the identification memory means receives transition request completion information;

said controller means transmitting the received transaction request completion information to the memory access device corresponding to the device identifier received from the identification memory means.

21. Apparatus according to claim 20 further including identifier reading means for reading said source identifier from said identification memory means upon receipt of a response from said memory and routing said response to the memory access device which made the original request.

22. Apparatus according to claim 21 further comprising memory empty detection means for detecting when every identifier written into storage locations in said identification memory has been read and preventing said identifier reading means from reading another identifier from said identification memory.

23. Apparatus according to claim 20 further comprising request controller means for receiving transaction requests from the plurality of memory access devices and sequentially issuing transaction requests to the memory.

24. Apparatus according to claim 23 further comprising identification writing means for, in response to a transaction request issued by said request controller, producing an identifier for the memory access device which originated the request and writing the identifier into the identification memory.

25. Apparatus according to claim 23 further comprising memory full detection means for detecting when every storage location in the identification memory has been filled with an identifier which has not been read from the identification memory and preventing said request controller means from issuing another transaction request.

* * * * *